United States Patent
Ruiterkamp (10) Patent No.: US 11,358,716 B2
(45) Date of Patent: Jun. 14, 2022

(54) SYSTEM AND METHOD FOR AIRBORNE WIND ENERGY PRODUCTION

(71) Applicant: AMPYX Power B.V., The Hague (NL)

(72) Inventor: Richard Ruiterkamp, GH Den Haag (NL)

(73) Assignee: AMPYX Power B.V., The Hague (NL)

( * ) Notice: Subject to any disclaimer, the term of this patent is extended or adjusted under 35 U.S.C. 154(b) by 0 days.

(21) Appl. No.: 17/074,833

(22) Filed: Oct. 20, 2020

(65) Prior Publication Data

US 2021/0047033 A1 Feb. 18, 2021

Related U.S. Application Data

(63) Continuation of application No. 14/467,413, filed on Aug. 25, 2014, now abandoned, which is a (Continued)

(30) Foreign Application Priority Data

Feb. 27, 2012 (EP) ..................................... 12157057

(51) Int. Cl.
*B64C 39/02* (2006.01)
*F03D 13/20* (2016.01)
(Continued)

(52) U.S. Cl.
CPC ............ *B64C 39/022* (2013.01); *B64C 19/00* (2013.01); *B64C 31/02* (2013.01); *B64C 39/024* (2013.01);
(Continued)

(58) Field of Classification Search
CPC ....... B64C 39/022; B64C 19/00; B64C 31/02; B64C 39/024; F03D 13/20; F03D 9/255;
(Continued)

(56) References Cited

U.S. PATENT DOCUMENTS

| 3,987,987 A | 10/1976 | Payne et al. |
| 5,931,416 A | 8/1999 | Carpenter |
| (Continued) |

FOREIGN PATENT DOCUMENTS

| DE | 202006005389 U1 | 8/2007 |
| GB | 2469740 A | 10/2010 |
| WO | 2007139412 A1 | 12/2007 |

OTHER PUBLICATIONS

International Search Report filed in PCT/EP2013/000478 dated Apr. 24, 2013.

*Primary Examiner* — Viet P Nguyen
(74) *Attorney, Agent, or Firm* — Rankin, Hill & Clark LLP (57) ABSTRACT

A system for electric power production from wind includes a glider having an airfoil, an on-board steering unit, a flight controller for controlling the steering unit, and a connection unit for a tether. The system further includes a ground station including a reel for the tether, a rotating electrical machine connected to the reel, and a ground station controller for controlling the reel and the rotating electrical machine. A master controller operates the system in at least first and second operation modes. In the first operation mode electric power is produced with the rotating electrical machine from rotation of the reel caused by reeling out the tether using a lift force generated upon exposure of the airfoil of the airborne glider to wind. In the second operation mode, the reel is driven by the rotating electrical machine, thereby reeling in the tether onto the reel.

19 Claims, 3 Drawing Sheets

Related U.S. Application Data continuation of application No. PCT/EP2013/000478, filed on Feb. 19, 2013.

(51) Int. Cl.

| | | |
|---|---|---|
| *F03D 9/25* | (2016.01) | |
| *F03D 5/00* | (2006.01) | |
| *B64C 19/00* | (2006.01) | |
| *B64C 31/02* | (2006.01) | |
| *F03D 5/02* | (2006.01) | |
| *H02G 11/02* | (2006.01) | |

(52) U.S. Cl.
CPC ............ *F03D 5/00* (2013.01); *F03D 5/02* (2013.01); *F03D 9/255* (2017.02); *F03D 13/20* (2016.05); *H02G 11/02* (2013.01); *F05B 2240/92* (2013.01); *F05B 2240/921* (2013.01); *F05B 2240/923* (2013.01); *Y02E 10/70* (2013.01)

(58) Field of Classification Search
CPC ... F03D 5/00; F03D 5/02; H02G 11/02; F05B 2240/92; F05B 2240/921; F05B 2240/923; Y02E 10/70
See application file for complete search history.

(56) References Cited

U.S. PATENT DOCUMENTS

| | | |
|---|---|---|
| 6,254,034 B1 | 7/2001 | Carpenter |
| 2002/0040948 A1 | 4/2002 | Ragner |
| 2005/0061910 A1 | 3/2005 | Wobben |
| 2007/0176432 A1 | 8/2007 | Rolt |
| 2009/0278353 A1 | 11/2009 | Da Costa Duarte Pardal et al. |
| 2010/0032948 A1* | 2/2010 | Bevirt .................. F03D 7/00 290/44 |
| 2011/0101692 A1* | 5/2011 | Bilaniuk ................ B64B 1/16 290/44 |
| 2011/0121570 A1 | 5/2011 | Bevirt et al. |
| 2011/0266809 A1* | 11/2011 | Calverley ................ F03D 9/25 290/55 |
| 2015/0266574 A1 | 9/2015 | Ruiterkamp |

* cited by examiner

Fig. 3 ated energy has to be spent in the interest of safety, because controllable flight of the kite requires a certain amount of pull on the tether.

The underlying problem of the invention is to provide for electric power production from wind using an airborne airfoil, wherein in particular the integrated energy yield and/or the operational safety are to be improved with respect to the prior art described above.

SYSTEM AND METHOD FOR AIRBORNE WIND ENERGY PRODUCTION

CROSS-REFERENCE TO RELATED APPLICATIONS

This application is a continuation of U.S. application Ser. No. 14/467,413, filed Aug. 25, 2014, which is a continuation of International Application No. PCT/EP2013/000478, filed Feb. 19, 2013, and claims priority to European Patent Application No. 12157057.6, filed Feb. 27, 2012.

BACKGROUND OF INVENTION

Field of Invention

The present invention generally relates to a system for electric power production from wind and, more particularly, to a method for operation of a system for electric power production from wind, and to a glider for a system for production power from wind and to the use of a glider for production of electric power from wind.

Description of Related Art

The production of electric power from wind is generally accomplished by airfoils or structures with an aerodynamic profile, which produce lift forces upon exposure to wind. Thereby, energy is extracted from the wind, and the energy can be converted into electricity by, for example, using the lift forces to drive an electrical generator. Well known wind turbines include a rotor with aerodynamically profiled rotor blades, wherein the lift forces of the rotor blades cause the rotor to turn. The rotor is mounted to an electrical generator that is, for example, located on top of a tower, for production of electricity.

In order to explore wind energy resources at altitudes above few hundred meters over ground, where the average wind is stronger and steadier due to less disturbing interaction with the earth's surface, it has been proposed to use airborne airfoils. These concepts are often referred to as airborne wind energy or airborne wind energy production.

U.S. Pat. No. 6,254,034 B1 discloses a tethered kite travelling a closed cycle. While the kite travels downwind, it is driven by the wind and the tether is pulled from a windlass drum that is rotationally connected to the rotor of an electrical generator. The rotor of the generator spins and produces energy. The cycle is completed by travelling the kite upwind back to the starting point. Net energy is gained when the energy generated during downwind travel of the kite exceeds the energy required for the upwind return.

One option for a low consumption of energy at the upwind return is to cause the wind to blow the kite to a high altitude at the end of the downwind travel. The kite then returns in an upwind descent. However, this method suffers from a large dead time, because no energy is generated during rise and return of the kite. Therefore, the integrated energy yield is relatively poor.

Another option is to alter the angle of attack or the equivalent supporting plane surface of the kite at the end of the downwind travel, thereby reducing the pull of the kite on the tether. The kite is now pulled back by switching the generator to motor operation, wherein due to the reduced pull less energy is consumed than has been produced during the preceding downwind travel. Here, a fraction of the

SUMMARY OF THE INVENTION

According to the invention, this problems on the art is solved by a system for electric power production from wind including a glider, the glider having an airfoil, on-board steering unit for pitching, rolling and yawing the glider when airborne, a flight controller for operation of the steering unit, and a connection unit for a tether. The system further includes a ground station including a reel for the tether, a rotating electrical machine connected to the reel, and a ground station controller for operation of the reel and the rotating electrical machine. The system further includes a master controller for controlling operation of the system in at least first and second operation modes. A first operation mode of the system is provided for electric power production with the rotating electrical machine from a rotation of the reel induced by reeling out the tether using a lift force generated upon exposure of the airfoil of the airborne glider to wind. A second operation mode of the system is provided for system recovery by driving the reel with the rotating electrical machine, thereby reeling in the tether onto the reel.

A glider or sailplane in terms of the invention in particular is a fixed wing aircraft, wherein the on-board steering unit allows for full flight maneuverability of the glider around its longitudinal axis, its lateral axis and its vertical axis. In terms of the invention, these three principle axes form a Cartesian coordinate system, wherein the origin of said coordinate system is defined to be at the center of gravity of the glider.

In general terms, with reference to straight and level flight, the longitudinal axis relates to the direction of motion, the vertical axis relates to the direction of lift and the lateral axis is essentially horizontal to complete a Cartesian coordinate system.

The glider for instance includes a fuselage and a main wing, wherein the main wing constitutes or comprises an airfoil. In this configuration, the longitudinal axis is essentially parallel to the fuselage, the lateral axis is essentially parallel to the main wing and the vertical axis is perpendicular to both the longitudinal and the lateral axis. Those skilled in the art will appreciate that the glider can have another airplane configuration, for instance an all-wing aircraft, with appropriate definitions of the principle axes.

In terms of the invention, rolling refers to a rotation of the glider around its longitudinal axis, pitching refers to a rotation of the glider around its lateral axis and yawing refers to a rotation of the glider around its vertical axis.

The steering unit of the glider, for instance, includes control surfaces to aerodynamically exert torque on the glider around one or more of the glider's principle axes. These control surfaces include so-called ailerons to mainly induce rolling, so-called elevators to mainly induce pitching, and a so-called rudder to mainly induce yawing. However, those skilled in the art will appreciate that other control surfaces known in aviation technology are also appropriate steering units in terms of the invention. In particular, a control surface can induce a rotation around an arbitrary axis that does not correspond to one of the principle axes of the glider.

Besides control surfaces, the steering unit of the glider, for instance, further includes actuators, such as electric motors or hydraulic systems with pumps and cylinders, for moving the control surfaces. These actuators are, for instance, powered by an on-board power source, such as a battery.

A glider provides the advantage of low aerodynamic resistance or drag and a high aerodynamic lift due to the fixed wing with rigid aerodynamic profile or airfoil, respectively. This is in particular beneficial, because the energy effectively extracted from the wind strongly depends on lift and drag, in particular on the so called lift-over-drag-ratio.

Since both the glider and the tether contribute to the overall drag, it is further preferred when the tether has a drag-optimized shape or structure. This can for instance be a helical structure, which turned out to have a lower resistance or drag than a tether with a circular cross section.

Another advantage of a glider is that the flight of the glider is stable even without any load on the tether, while a kite requires a certain pull on the tether for stable flight. Therefore, the invention allows for zero tether load and correspondingly minimum energy consumption during system recovery in the second operation mode.

The flight of the glider is controllable and stable by itself, in particular without any connection to the ground. Even in case of system failures, for example when the generator load on the reel is lost or the tether breaks, the glider can be landed safely. The system according to the invention thus provides for particularly effective and safe production of electric power from wind energy.

It is preferred that the flight controller provide for a first flight control mode for automated flight operation and for a second flight control mode for manual operation, in particular via a remote control unit with wired or wireless connection to the flight controller. For example, the first flight control mode provides for automated operation with optimized energy yield, wherein the second flight control mode allows for manual intervention during maintenance and testing of the system as well as for emergency interventions in the case of failures. This way, the operation is simplified and the safety in operation is further enhanced.

In further accordance with the present invention, the glider includes an air speed sensor for determining an air speed of the glider. In terms of the invention, air speed refers to the speed of movement or velocity, respectively, of the glider with respect to the surrounding air. In particular due to the presence of wind, the air speed in general differs from the ground speed of the glider, i.e. the velocity of the glider relative to the ground. The air speed sensor preferably is a directional sensor providing both the magnitude and the direction of the glider's air speed.

Knowledge about the air speed of the glider is in particular beneficial for optimized flight control, in particular for maximizing the lift force and the averaged energy yield. For best precision of the air speed measurement, the air speed sensor is preferably arranged at the glider. Alternatively, the air speed sensor can also be positioned at the tether, wherein the position of the air speed sensor at the tether is preferably close to the connection between the tether and the glider.

In further accordance with the present invention, the glider includes a control unit incorporating both the flight controller of the glider and the master controller of the system. This way, the connection between the flight controller and the master controller is particularly short in a physical sense, making it fast and robust against distortion and failure. In particular, fast feedback between the flight operations, which is rather complex and influenced by eventually fast changing wind conditions, and the operation of the system as a whole is or can be established.

In further accordance with the present invention, the ground station further comprises a tension sensor for determining a tension of the tether. The tension of the tether is a good indicator for the overall system load and can, for instance, be used as an input parameter for controlled reeling out of the tether. The tension sensor is, for example, arranged at the ground station or integrated into the tether, wherein the tension sensor preferably is or can be connected to the ground station controller.

The ground station controller is preferably designed for retaining a predetermined target tension of the tether, in particular during reeling out the tether. By this measure, negative impact of the load, which is exerted on the glider via the tether, on the glider flight behavior can be minimized.

The ground station controller preferably is designed for retaining a predetermined reel speed, in particular during reeling in the tether. In terms of the invention, reel speed refers to the length of tether being reeled in or reeled out in a given amount of time. Thus, the reel speed is in particular correlated with the rotational velocity of the rotating reel.

Retaining a predetermined reel speed, which is, for instance, accomplished by retaining a predetermined target rotational velocity of the reel, is very effective in reducing sagging of the tether when the lift force or load exerted on the tether is low.

Preferably, the tether includes a power transmission line between the glider and the ground station. This way, the various systems of the glider, such as electronics of the flight controller or actuators of the flight controller, are powered from the ground. For emergency cases, where the power connection between the ground and the glider may be broken, the glider, however, can comprise a relatively low capacity power source allowing for control and safe landing of the glider.

The tether preferably includes a data transmission line between the glider and the ground station, for instance for communication between the flight controller, the ground station controller and/or the main controller. Additional, alternative or redundant communication channels can for instance be realized by wireless transmission.

The present invention further includes a method for operation of a system for electric power production from wind, the system including a glider connected to a tether and a ground station with a reel for the tether, wherein the system is operated alternately in a first operation mode for power production and a second operation mode for system recovery. The first operation mode includes:
  steering the glider to follow a first flight pattern, thereby generating a lift force via an airfoil of the glider being exposed to the wind,
  pulling the tether via said lift force and reeling out the tether, thereby inducing a rotation of the reel, and
  converting the rotation of the reel into electric power via a rotating electrical machine connected to the reel,
The second operation mode includes:
  steering the glider to follow a second flight pattern for reducing the pull on the tether and
  reeling in the tether onto the reel by driving the reel via said rotating electrical machine connected to the reel.

The integrated energy yield, i.e. the amount of electric power produced at given wind conditions in certain amount of time, is particularly optimized when the lift force generated by the airfoil is maximized during operation of the system in the first operation mode and minimized during operation in the second operation mode. The energy yield is further increased when the time required for reeling in the tether, that is the minimum duration for the system to be operated in the second operation mode, where no electric power is produced, is as short as possible.

Both aspects are optimized by the invention due to the beneficial features of the glider mentioned already above. In particular, the maneuverability of a glider allows for a first flight pattern, which is in particular a high lift flight pattern, where the glider for instance flies downwind of the ground station across the wind along a flight path, which for instance resembles a circular or eight-shaped figure. Highest lift forces are generally achieved in fast cross-wind flight of the glider.

In the second flight pattern, which is in particular a low lift flight pattern, the glider for instance is brought in a descent towards the ground station. Here, the pull on the tether is reduced and eventually brought to zero. This way, minimum energy is consumed for spinning the reel, while no energy is required to pull the glider towards the ground station. At the same time, the speed of the glider towards the ground station is maximized and the dead time, i.e. the time required for system recovery, is minimized.

Preferably, reeling out the tether is controlled to retain a target tension of the tether, which in particular is predetermined as a function of an air speed of the glider. The air speed of the glider in particular is the velocity of the airfoil relative to the air, and thus is an indication for the lift force generated by the airfoil. The target tension does not have to be constant with time. For instance, the air speed, which is a vector quantity and has a magnitude as well as a directional component, will change over the course of the flight pattern with varying angle between direction of flight of the glider and the wind direction. Also, changes in the wind conditions result in air speed differences.

It is also preferred that reeling in the tether is controlled to retain a target reel speed, which in particular is predetermined as a function of an air speed of the glider. However, the target reel speed can also be predetermined from other observables, for instance a ground speed of the glider.

Further characteristics of the invention will become apparent from the description of the embodiments according to the invention together with the claims and the included drawings. Embodiments according to the invention can fulfil individual characteristics or a combination of several characteristics.

According to the invention, with respect to a feature in particular or particularly means that the feature is an optional feature.

BRIEF DESCRIPTION OF THE DRAWINGS

The invention is described below, without restricting the general intent of the invention, based on exemplary embodiments, wherein reference is made expressly to the drawings with regard to the disclosure of all details according to the invention that are not explained in greater detail in the text, wherein.

DETAILED DESCRIPTION OF THE INVENTION

In the drawings, the same or similar types of elements or respectively corresponding parts are provided with the same reference numbers in order to prevent the elements from needing to be reintroduced.

Figure 1:
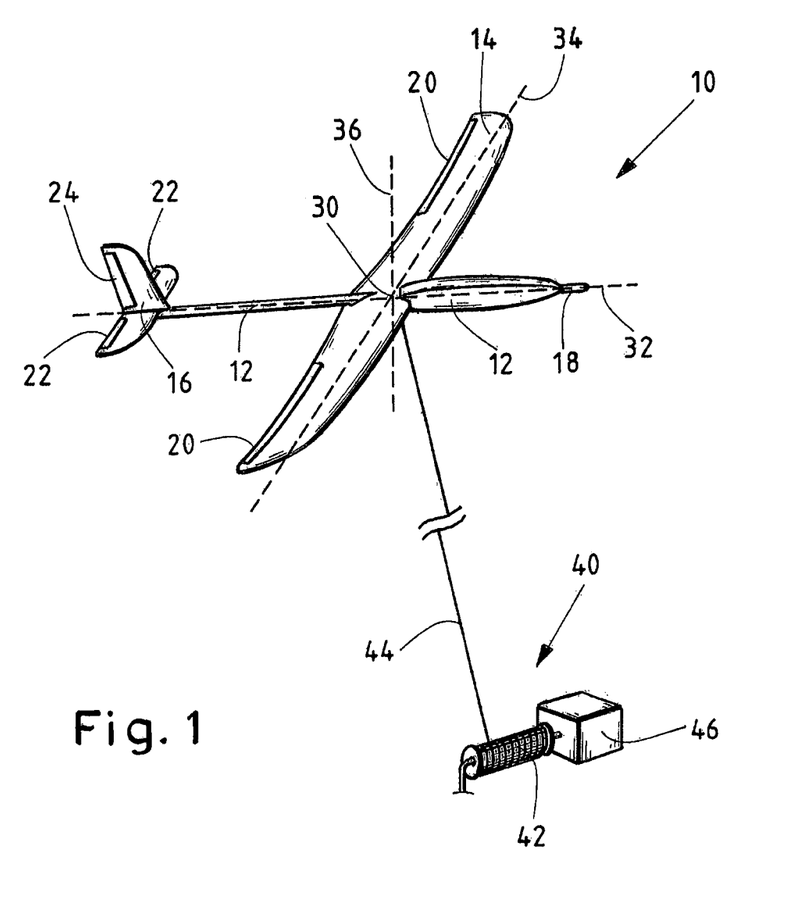
FIG. 1 schematically illustrates a system according to the invention.

FIG. 1 shows an exemplary embodiment of a system for electric power production from wind according to the invention.

The airborne or potentially airborne part of the system comprises a glider 10, which in the embodiment depicted in FIG. 1 is designed to be a fixed wing aircraft. The glider 10 comprises a fuselage 12, a main wing 14, a tailplane 16 and control surfaces 20, 22, 24. Also shown are the longitudinal axis 32, the lateral axis 34 and the vertical axis 36, which meet at the center of gravity 30 of the glider and which constitute the intrinsic coordinate system of the glider.

In the example shown, the fuselage 12 comprises a tube constructed from fiber reinforced composite material as mechanical backbone between the main wing 14 and the tailplane 16 and a nacelle for electronics, power source, sensors and the like, which is mounted in front of the main wing 14.

The main wing 14 can for instance be constructed from a single wing, as in the embodiment depicted in FIG. 1. However, alternative designs, for instance with a separate main wing 14 on either side of the fuselage 12 are within the scope of the invention.

In flight, the glider 10 is maneuvered by control surfaces, which in the exemplary embodiment comprise ailerons 20 at either side of the main wing 12, as well as elevators 22 and a rudder 24 at the tailplane 16. The control surfaces 20, 22, 24 for instance are hinged surfaces used to induce torque around the principle axes 32, 34, 36 of the glider 10 by aerodynamic means.

Torque around the longitudinal axis 32 is induced by the ailerons 20, which can be or are operated simultaneously and in opposite directions. Here, opposite directions means that when the left aileron is moved upwards with respect to the main wing 14, the right aileron is moved downwards. By this, lift is enhanced on the right side of the main wing 14 and reduced on the left side of the main wing 14, causing a torque around the longitudinal axis 32. The resulting movement of the glider 10, a rotation around its longitudinal axis 32, is referred to as rolling.

A rotation of the glider 10 around its lateral axis 34, which is referred to as pitching, is achieved by the elevators 22, which are used to increase or decrease the lift at the tailplane, thereby inducing a torque around the lateral axis 34.

Rotation of the glider 10 around its vertical axis 36, which is referred to as yawing, is induced by the rudder 24.

The glider 10 is connected to the ground station 40 via a tether 44, which is attached to or connected with the glider 10 at a connection unit, which is preferably arranged close to the center of gravity 30 of the glider 10. This way, varying loads on the tether 44 do not significantly impair the balance of the glider 10 in flight.

At the ground station 40, excess length of the tether 44 is stored on a reel 42, which is connected to a rotating electrical machine 46. The rotation electrical machine 46 is connected to an electricity storage and/or distribution system (not shown) such as a power grid, a transformer station or a large scale energy reservoir. Those skilled in the art will appreciate that the power storage and/or distribution system can be any device or system capable of receiving electricity from and delivering electricity to the rotating electrical machine. The ground station 40 further comprises a tension sensor 48 for determining a tension of the tether 44. The tension of the tether 44 is a good indicator for the overall system load and can, for instance, be used as an input parameter for controlled reeling out of the tether 44.

Figure 2A:
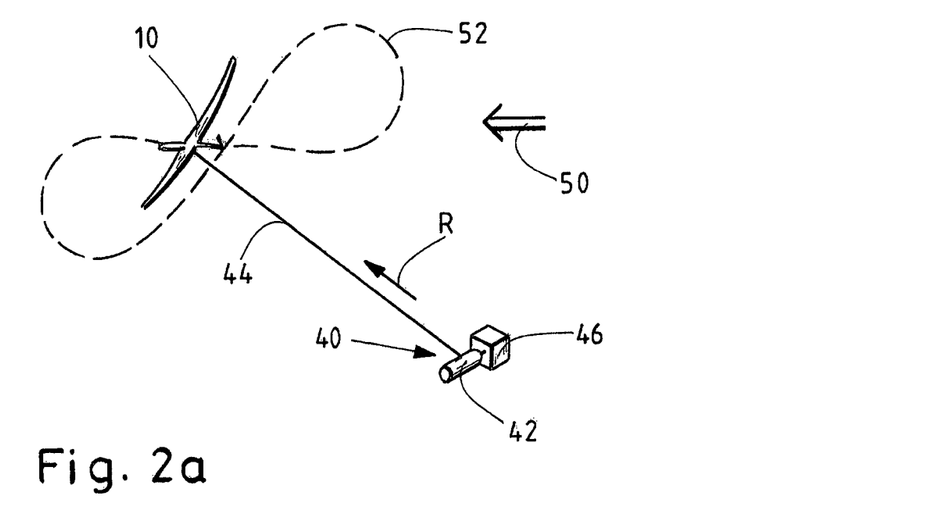
FIG. 2a schematically illustrates operation of a system according to the invention in a first operation mode.
Figure 2B:
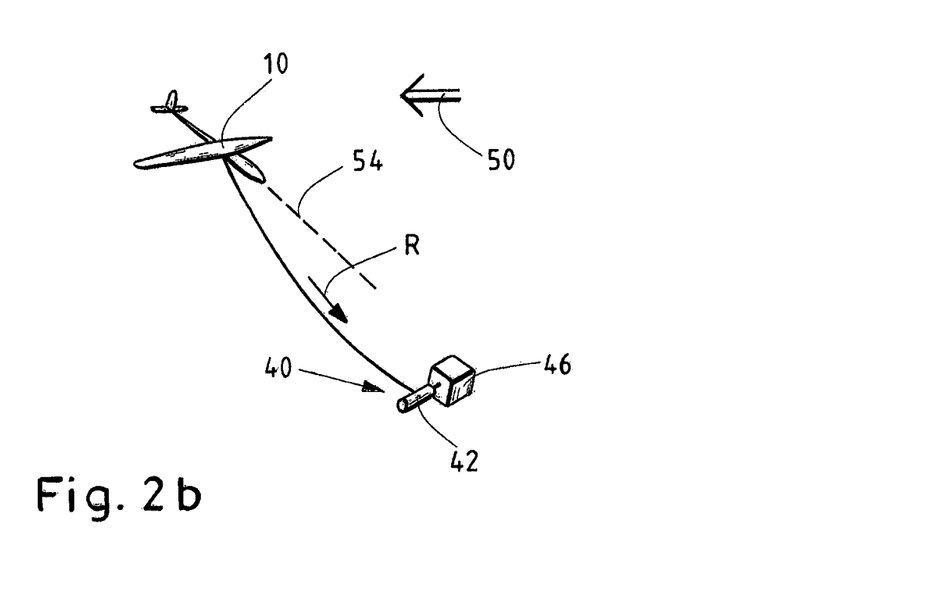
FIG. 2b schematically illustrates operation of a system according to the invention in a second operation mode.

The system shown in FIG. 1 is alternately operated in a first operation mode for production of electric power, illustrated in FIG. 2a, and a second operation mode for system recovery, illustrated in FIG. 2b.

In the first operation mode, which in particular is an energy production operation mode, the glider 10 is steered to follow a high lift flight pattern indicated by line 52 downwind of the ground station 40. The direction of the wind is indicated by arrow 50. During cross-wind flight, in particular fast cross-wind flight, the airfoil or the main wing 14, respectively, of the glider 10 generates a lift force much larger than required to keep the glider 10 at a given altitude. As a consequence, the glider exerts a pull on the tether 44, which is correlated to the excess lift force.

The pull on the tether 44 is used for reeling out the tether 44 from the reel 42 in direction of arrow R, thereby inducing a rotation of the reel 42. The resulting torque, which in particular depends on the diameter of the reel 42 and the force with which the tether 44 is pulled, is transmitted to the rotating electrical machine 46, where the mechanical energy is transformed to the electric power. Optionally, a gear box is arranged between the reel 42 and the rotating electrical machine 46, which is not shown in the figures for reasons of simplicity.

By controlling and influencing the rotational speed of the reel 42, for instance by an adjustable counter torque of the rotating electrical machine, the load on the tether 44 and on the glider 10, respectively, can be influenced.

As long as the tether 44 is reeled out, the glider 10 flies away from the ground station 40. Keeping the system in the first operation mode thus is limited by the overall length of the tether 44.

According to the invention, there is thus provided for a second operation mode for system recovery, in particular for recovery of the tether. This second operation mode is illustrated in FIG. 2b.

For recovery of the tether 44, i.e. for reeling in the tether 44 onto the reel 42, the rotating electrical machine 46 is operated as a motor rather than as a generator. The necessary power for instance is provided or delivered by the electricity storage and/or distribution system.

In order to minimize the power consumption during system recovery, the pull on the tether 44 is reduced by steering the glider 10 to follow a low lift flight pattern indicated by dashed line 54. This low lift flight pattern 54 for instance is a descent or a fast dive of the glider 10 against the wind 50 towards the ground station 40. The low lift flight pattern 54 can also be an approach of the glider 10 towards the ground station 40 without loss in altitude, including a slight gain in altitude.

As the glider 10 approaches the ground station 40, the free length of the tether 44 is shortened and the tether 44 is reeled in onto the reel 42 as indicated by arrow R'.

It is preferred that the pull on the tether 44 is as low as possible in order to minimize power consumption for reeling in the tether 44 and as fast as possible in order to minimize the dead time, i.e. the period of time where the system does not produce electric power. These goals are preferably met by controlling reeling in the tether 44 to retain a target reel speed, which in particular depends on the velocity of the glider 10 approaching the ground station 40, which for instance can be derived from an air speed of the glider 10.

Figure 3:
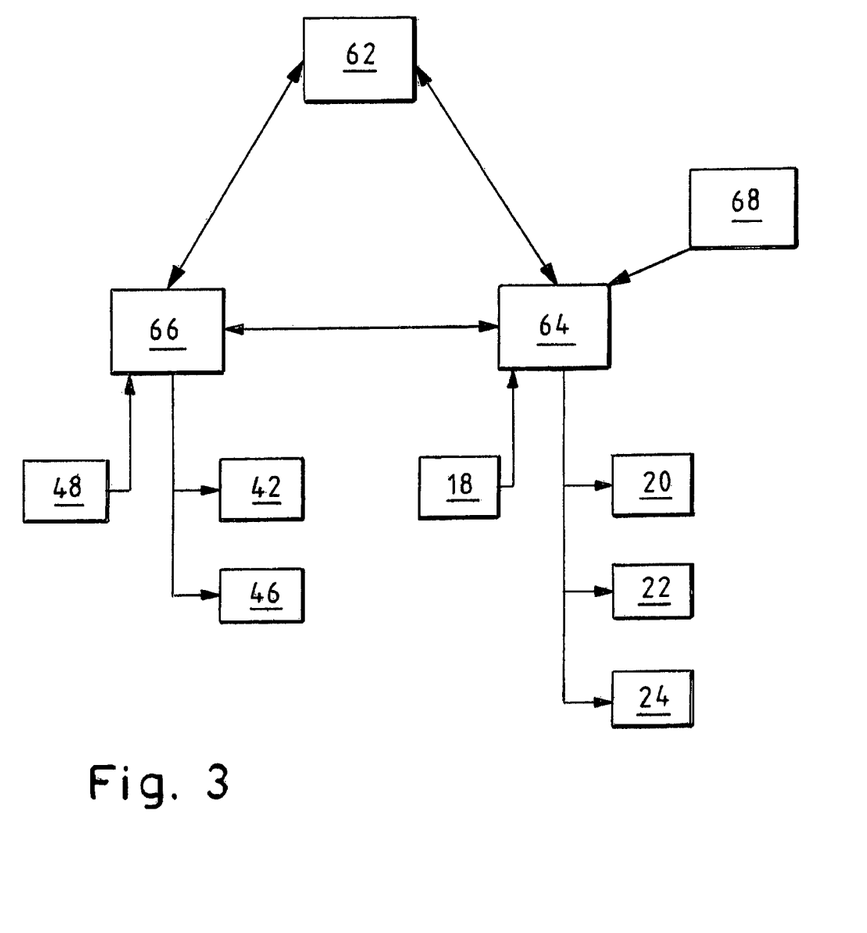
FIG. 3 is a block diagram illustrating the control of a system according to the invention.

FIG. 3 shows a block diagram of an exemplary control scheme for the system described above.

The control scheme provides for a modular design with a flight controller 64, a ground station controller 66 and a master controller 62.

The flight controller 64 is designed to control and/or regulate the devices and actuators associated to flight operation of the glider 10. For example, these include but are not limited to ailerons 20, elevators 22 and rudder 24 of the glider 10.

The flight controller 64, for instance, includes algorithms and feedback loops for automated flight operation of the glider 10. It will be appreciated by those skilled in the art that there will be appropriate sensors connected to the flight controller 64 for determining and monitoring the flight conditions, wherein an air speed sensor 18 is shown in FIG. 3 as one example.

The ground station controller 66 has the purpose of controlling and/or regulating the components of the ground station 40, in particular the reel 42 and the rotating electrical machine 46. The tension sensor 48 is, for example, arranged at the ground station 40 or integrated into the tether 44, wherein the tension sensor 48 preferably is or can be connect to the ground station controller 66. It will be appreciated by those skilled in the art that the conversion of mechanic energy to electric power, i.e. the operation of the rotating electrical machine 46 as a generator, as well as reeling in the tether 44, i.e. the operation of the rotating electrical machine 46 as a motor, is also controlled and/or regulated by the ground station controller 66.

Both the flight controller 64 and the ground station controller 66 in particular provide for different behavior associated with different operation modes of the system according to the invention. The operation mode of the system itself, in particular a first operation mode for production of electric power and a second operation mode for system recovery, is controlled and/or regulated by a master controller 62. In particular, the master controller 62 preferably includes or provides automated decision making and switching between one operation mode and the other.

As indicated by the arrows in FIG. 3, the flight controller 64, the ground station controller 66 and the master controller 62 are connected to each other via bi-directional communication channels, wherein in particular the flight controller 64 and the ground station controller 66 communicate status information about the glider 10 or the ground station 40, respectively, to the master controller 62. In reverse, the master controller 62 communicates the current operation mode of the system to both the flight controller 64 and the ground station controller 66, wherein control and/or regulation of the glider 10 and the ground station 40 is performed independently by the flight controller 64 and the ground station controller 66, respectively.

The modular design of the control scheme shown in FIG. 3 has the advantage that operational safety of the glider 10 and the ground station 40, which are normally separated by several hundred meters, is guaranteed individually even in the case of signal delays, signal distortions and communication channel failures.

It does not contradict the modular approach when the master controller 62 is arranged in close proximity to either the flight controller 64 or the ground station controller 66. In particular, the master controller 62 and the flight controller 64 are preferably both arranged on board the glider 10 and can in particular be combined into a single control unit.

While the ground station 40 and the ground station controller 66, which preferably are physically located at or close to the ground station 40, are easily accessible for maintenance and testing, the airborne glider 10 is not. It is therefore desirable to have the possibility to intervene in the control, in particular the flight control, of the glider 10. For this purpose, the flight controller 64 allows for external access to the flight control via a remote control unit 68, which is preferably connected to the flight controller 64 via a wireless communication channel.

All named characteristics, including those taken from the drawings alone, and individual characteristics, which are disclosed in combination with other characteristics, are considered alone and in combination as important to the invention. Embodiments according to the invention can be fulfilled through individual characteristics or a combination of several characteristics.

What is claimed is:

1. A system for electric power production from wind comprising:
    a tether;
    a glider, said glider having
        an airfoil,
        on-board steering means with control surfaces configured to aerodynamically exert torque on the glider for pitching, rolling and yawing the glider when airborne,
        a flight control means for operation of the steering means, and
        a connection unit for attaching or connecting the tether to the glider, said connection unit being arranged close to the center of gravity of the glider;
    a ground station, said ground station having
        a reel for the tether,
        a rotating electrical machine connected to the reel, and
        a ground station control means for operation of the reel and the rotating electrical machine; and
    a master control means for operation of the system in at least two alternative operation modes, wherein a first operation mode of the system is provided for electric power production with the rotating electrical machine from a rotation of the reel induced by reeling out the tether using a lift force generated upon exposure of the airfoil of the airborne glider to wind, and wherein a second operation mode of the system is provided for system recovery by driving the reel with the rotating electrical machine, thereby reeling in the tether onto the reel.

2. The system according to claim 1, wherein the flight control means provides for a first flight control mode for automated flight operation and for a second flight control mode for manual operation.

3. The system according to claim 2, wherein the system further comprises a remote control unit with a wired connection to the flight control means for manual operation in the second flight control mode.

4. The system according to claim 2, wherein the system further comprises a remote control unit with a wireless connection to the flight control means for manual operation in the second flight control mode.

5. The system according to claim 1, wherein the glider further comprises an air speed sensor for determining an air speed of the glider.

6. The system according to claim 1, wherein the glider comprises a control unit incorporating both the flight control means and the master control means.

7. The system according to claim 1, wherein the ground station further comprises a tension sensor for determining a tension of the tether.

8. The system according to claim 1, wherein the ground station control means is designed for retaining a predetermined target tension of the tether during reeling out the tether.

9. The system according to claim 1, wherein the ground station control means is designed for retaining a predetermined target reel speed during reeling in the tether.

10. The system according to claim 1, wherein the tether comprises a power transmission line and/or a data transmission line between the glider and the ground station.

11. The system according to claim 1, wherein the glider has a tubular fuselage constructed from fiber reinforced composite material.

12. The system according to claim 11, wherein the connection unit for attaching or connecting the tether to the glider is attached to the fuselage of the glider.

13. The system according to claim 1, wherein the control surfaces of the on-board steering means are configured to aerodynamically exert torque on the glider, when airborne, for full flight maneuverability of the glider including rolling of the glider relative to its longitudinal axis, pitching of the glider relative to its lateral axis, and yawing of the glider relative to its vertical axis, and wherein said axes form a Cartesian coordinate system, the origin of which, is at the center of gravity of the glider.

14. The system according to claim 13, wherein glider comprises:
    a fuselage;
    a main wing including the airfoil and ailerons; and
    a tailpiece including elevators and a rudder; and
    wherein the ailerons mainly induce rolling, the elevators mainly induce pitching, and the rudder mainly induces yawing.

15. The system according to claim 1, wherein the tether is a helical structure that does not have a circular cross section.

16. A method for electric power production from wind, the method comprising:
    providing a system according to claim 1; and
    alternately operating the system in a first operation mode for power production and in a second operation mode for system recovery;
    wherein the first operation mode comprises
        steering the glider to follow a first flight pattern, thereby generating a lift force by means of an airfoil of the glider being exposed to the wind,
        pulling the tether by means of said lift force and reeling out the tether, thereby inducing a rotation of the reel, and
        converting the rotation of the reel into electric power by means of a rotating electrical machine connected to the reel, and
    wherein the second operation mode comprises
        steering the glider to follow a second flight pattern for reduced pull on the tether, and
        reeling in the tether onto the reel by driving the reel by means of said rotating electrical machine connected to the reel.

17. The method according to claim 16, wherein reeling out the tether is controlled to retain a target tension of the tether, which is predetermined as a function of an air speed of the glider.

18. The method according to claim 16, wherein reeling in the tether is controlled to retain a target reel speed, which is predetermined as a function of an air speed of the glider.

19. A glider comprising an airfoil for generating a lift force upon exposure of the airfoil to wind, on-board steering means with control surfaces configured to aerodynamically exert torque on the glider for pitching, rolling and yawing the glider when airborne, a flight control means for operation of the steering means and a connection unit for attaching or connecting a tether to the glider, said connection unit being arranged close to the center of gravity of the glider, an on-board control unit incorporating the flight control means, and a master control means configured to operate the glider in at least two alternative operation modes including a first operation mode for electric power production in which the glider is steered to follow a first flight pattern that produces a pulling force on the tether and a second operation mode for recovery in which the glider is steered to follow a second flight pattern that produces a pulling force on the tether that is reduced as compared to the pulling force produced in the first operation mode.

* * * * *